US009976315B2

(12) United States Patent
Pantelides et al.

(10) Patent No.: US 9,976,315 B2
(45) Date of Patent: May 22, 2018

(54) ELONGATE MEMBER REINFORCEMENT

(71) Applicant: University of Utah Research Foundation, Salt Lake City, UT (US)

(72) Inventors: Chris P. Pantelides, Salt Lake City, UT (US); Lawrence D. Reaveley, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 296 days.

(21) Appl. No.: 14/455,570

(22) Filed: Aug. 8, 2014

(65) Prior Publication Data

US 2015/0075099 A1 Mar. 19, 2015

Related U.S. Application Data

(60) Provisional application No. 61/863,802, filed on Aug. 8, 2013.

(51) Int. Cl.
*E04G 23/02* (2006.01)
*H04W 16/26* (2009.01)
(Continued)

(52) U.S. Cl.
CPC ......... *E04G 23/0218* (2013.01); *E04H 9/025* (2013.01); *E04H 9/14* (2013.01);
(Continued)

(58) Field of Classification Search
CPC ........ E04G 23/0218; E04G 2023/0251; E04H 9/025; E04H 9/14; E04H 12/12;
(Continued)

(56) References Cited

U.S. PATENT DOCUMENTS 729,176 A * 5/1903 Hodges .......................... 52/296
3,355,852 A 12/1967 Lally
(Continued)

FOREIGN PATENT DOCUMENTS

CN 2014/60026 U 5/2010
CN 203174881 U 9/2013
(Continued)

OTHER PUBLICATIONS

Ameli et al.; "Seismic evaluation of grouted splice sleeve connections for reinforced precast concrete column-to-cap beam joints in accelerated bridge construction"; Precast/Prestressed Concrete Institute Journal; Mar.-Apr. 2015; pp. 80-103.
Amico; "Stay-Form: the stay-in-place concrete form; Application Detail Manual Load Tables and Spec Data Sheets"; Jul. 11, 2014; pp. 1-37; Alabama Metal Industries Corporation; Birmingham, Alabama.
(Continued)

*Primary Examiner* — Brent W Herring
(74) *Attorney, Agent, or Firm* — Thorpe North & Western, LLP

(57) ABSTRACT

An elongate member, reinforcement system and associated methods is disclosed. The system can include an elongate member, a structure associated with an end of the elongate member, a support member coupled to the structure and laterally offset from the elongate member extending about an end portion of the elongate member, a support layer surrounding the end portion of the elongate member such that at least a portion of the support member is between the support layer and the elongate member, and a structural filler disposed between the support layer and the elongate member. A load tending to cause relative movement of the end portion of the elongate member and the structure can be transferred through the structural filler and the support member to provide support for the elongate member.

27 Claims, 6 Drawing Sheets

(51) Int. Cl.

| | |
|---|---|
| *H04W 52/02* | (2009.01) |
| *H04W 48/16* | (2009.01) |
| *E04H 9/02* | (2006.01) |
| *H04W 24/02* | (2009.01) |
| *E04H 9/14* | (2006.01) |
| *H04W 48/12* | (2009.01) |
| *H04W 74/08* | (2009.01) |
| *E04H 12/12* | (2006.01) |
| *E04H 12/22* | (2006.01) |

(52) U.S. Cl.
CPC .......... *H04W 16/26* (2013.01); *H04W 24/02* (2013.01); *H04W 48/16* (2013.01); *H04W 52/0219* (2013.01); *E04G 2023/0251* (2013.01); *E04H 12/12* (2013.01); *E04H 12/2215* (2013.01); *H04W 48/12* (2013.01); *H04W 74/0833* (2013.01); *Y02B 60/50* (2013.01)

(58) Field of Classification Search
CPC .. E04H 12/2215; H04W 48/16; H04W 16/26; H04W 52/0219; H04W 24/02; H04W 74/0833; H04W 48/12; Y02B 60/50
USPC ...... 52/423, 297, 295, 296, 514, 514.5, 170; 405/211, 233, 239
See application file for complete search history.

(56) References Cited

U.S. PATENT DOCUMENTS

| | | | |
|---|---|---|---|
| 3,390,951 A | 7/1968 | Finger et al. | |
| 3,645,057 A * | 2/1972 | Kaplan | E04H 12/2284 248/349.1 |
| 3,798,867 A | 3/1974 | Starling | |
| 4,006,600 A * | 2/1976 | Guild | 405/253 |
| 4,019,301 A | 4/1977 | Fox | |
| 4,023,374 A | 5/1977 | Colbert et al. | |
| 4,116,013 A | 9/1978 | Hellmers | |
| 4,132,082 A * | 1/1979 | Merjan | 405/253 |
| 4,161,090 A * | 7/1979 | Watts, Jr. | 52/301 |
| 4,295,308 A | 10/1981 | Korfanta | |
| 4,306,821 A | 12/1981 | Moore | |
| 4,439,071 A | 3/1984 | Roper, Jr. | |
| 4,543,764 A | 10/1985 | Kozikowski | |
| 4,644,722 A * | 2/1987 | Phillips | 52/514 |
| 4,673,157 A * | 6/1987 | Wells | E02D 27/02 249/13 |
| 4,702,057 A | 10/1987 | Phillips | |
| 4,779,389 A | 10/1988 | Landers | |
| 4,892,601 A | 1/1990 | Norwood | |
| 5,010,702 A | 4/1991 | Daw et al. | |
| 5,043,033 A | 8/1991 | Fyfe | |
| 5,177,919 A * | 1/1993 | Dykmans | 52/298 |
| 5,376,316 A | 12/1994 | Weekers | |
| 5,481,846 A * | 1/1996 | Macchietto | E04C 3/32 248/158 |
| 5,625,988 A * | 5/1997 | Killick | E01F 9/0117 248/156 |
| 5,644,877 A | 7/1997 | Wood | |
| 5,878,540 A * | 3/1999 | Morstein | E02D 27/42 52/292 |
| 6,123,485 A | 9/2000 | Mirmiran et al. | |
| 6,189,286 B1 | 2/2001 | Seible et al. | |
| 6,256,960 B1 | 7/2001 | Babcock et al. | |
| 6,364,575 B1 | 4/2002 | Bradley et al. | |
| 6,536,991 B1 * | 3/2003 | Trader et al. | 405/216 |
| 6,599,632 B1 | 7/2003 | Gillette | |
| 6,773,206 B2 | 8/2004 | Bradley et al. | |
| 6,997,260 B1 | 2/2006 | Trader et al. | |
| 7,300,229 B1 | 11/2007 | Fyfe et al. | |
| 7,409,798 B2 * | 8/2008 | Freeby et al. | 52/166 |
| 7,520,535 B2 | 4/2009 | Gronquist | |
| 7,533,505 B2 * | 5/2009 | Henderson | 52/292 |
| 7,618,217 B2 * | 11/2009 | Henderson | 405/255 |
| 7,621,097 B2 | 11/2009 | Wilhour | |
| 7,712,530 B1 * | 5/2010 | Edgley | C04B 28/02 106/800 |
| 7,721,494 B2 | 5/2010 | Lee | |
| 7,748,307 B2 * | 7/2010 | Hallissy | E01D 19/16 52/167.1 |
| 8,151,526 B2 | 4/2012 | Klein | |
| 8,240,633 B2 | 8/2012 | Penza | |
| 8,407,967 B2 | 4/2013 | Brindle, Jr. | |
| 8,468,776 B2 * | 6/2013 | Cortina-Ortega | F03D 11/04 52/831 |
| 8,484,915 B1 | 7/2013 | Abbas et al. | |
| 8,572,905 B1 * | 11/2013 | Driggers | 52/169.9 |
| 8,650,831 B2 * | 2/2014 | Ehsani | 52/741.3 |
| 8,713,891 B2 | 5/2014 | Carr et al. | |
| 8,943,774 B2 | 2/2015 | Richardson et al. | |
| 9,096,986 B2 | 8/2015 | Henderson | |
| 9,273,479 B2 | 3/2016 | Richardson et al. | |
| 9,359,780 B2 | 6/2016 | Richardson et al. | |
| 9,574,359 B2 | 2/2017 | Berset | |
| 2002/0094239 A1 | 7/2002 | Bradley et al. | |
| 2003/0085482 A1 | 5/2003 | Sincock et al. | |
| 2004/0154263 A1 | 8/2004 | Li et al. | |
| 2005/0246988 A1 * | 11/2005 | Patrick | 52/309.11 |
| 2006/0070338 A1 | 4/2006 | Pantelides et al. | |
| 2008/0104924 A1 | 5/2008 | Wilhour | |
| 2010/0218708 A1 * | 9/2010 | Carr | E04G 23/0218 109/83 |
| 2011/0061321 A1 * | 3/2011 | Phuly | 52/297 |
| 2011/0131914 A1 | 6/2011 | Richardson et al. | |
| 2011/0277410 A1 | 11/2011 | Richardson et al. | |
| 2011/0308186 A1 * | 12/2011 | Cortina-Ortega | F03D 11/04 52/578 |
| 2012/0047830 A1 * | 3/2012 | Phuly | 52/294 |
| 2012/0124937 A1 | 5/2012 | Teng et al. | |
| 2013/0195541 A1 * | 8/2013 | Pantelides et al. | 403/188 |
| 2014/0260023 A1 * | 9/2014 | Henderson | 52/295 |
| 2015/0191924 A1 | 7/2015 | Richardson et al. | |
| 2016/0138285 A1 | 5/2016 | Berset | |
| 2016/0145882 A1 | 5/2016 | Ehsani | |
| 2016/0305139 A1 | 10/2016 | Richardson et al. | |

FOREIGN PATENT DOCUMENTS

| | | |
|---|---|---|
| DE | 19939799 A1 | 2/2001 |
| EP | 2163800 A2 | 8/2009 |
| GB | 2210135 A | 1/1989 |
| JP | 11256836 A | 9/1999 |
| WO | WO 2007/105018 A1 | 9/2007 |

OTHER PUBLICATIONS

BASF; "Wabo A-P-E: Advanced Pile Encapsulation"; Jul. 11, 2014; 8 pages; BASF Building Systems; Shakopee, Minnesota.

Chalioris et al.; "Behaviour of rehabilitated RC beams with self-compacting concrete jacketing" Construction and Building Materials (55); Mar. 31, 2014; 257(17); Reed Business Information, Inc.

Karimi et al.; "Behavior of Slender Steel-Concrete Composite Columns Wrapped with FRP Jackets"; Journal of performance of constructed facilities 26.5; 2012;vol. 26 (5); American Society of Civil Engineers; Reston Virginia.

Lwin et al.; "U.S. Highway Bridge Performance from Recent Natural Hazards: Hurricanes"; J. Perform. Constr. Facil.; Jan./Feb. 2014; pp. 40-48.

Mirmiran et al.; "An innovative FRP-concrete composite construction for seismic regions"; Conference paper; May 15-17, 1995; vol. 2; pp. 1047-1054; Tehran, Iran.

Yi et al.; "Blast Load Effects on Highway Bridges. II: Failure Modes and Multihazard Correlations"; J. Bridge Eng.; American Society of Civil Engineers; 2013; pp. 04013024.1-04013024.12.

\* cited by examiner

ELONGATE MEMBER REINFORCEMENT

RELATED APPLICATION(S)

This application claims the benefit of U.S. Provisional Patent Application No. 61/863,802 filed on Aug. 8, 2013, which is incorporated herein by reference.

GOVERNMENT INTEREST

This invention was made with government support under Utah Department of Transportation Grant No. 128775. The State of Utah has certain rights to this invention.

BACKGROUND

In recent years, fiber reinforced polymer (FRP) composites have emerged as an alternative to traditional materials for strengthening and rehabilitation of structures. The light weight of FRP, high-strength to weight ratio, corrosion resistance, and high efficiency of construction are among many of the advantages which encourage civil engineers to use this material. FRP composites have been used in the retrofit of bridge columns due to insufficient capacity or displacement ductility. FRP jackets can provide lateral confinement to the concrete columns that can substantially enhance their compressive strength and ultimate axial strain. Due to the increasing need for reinforcement and repair of structures, research has been carried out to investigate the behavior of FRP-confined concrete structures. Although many reinforcing methods result in moderate improvements in mechanical properties, the costs of such methods tend to outweigh the benefits and increase in strength. In addition, effective reinforcement and repair methods for structures such as columns, pipes, and walls with respect to a footing or beam have yet to be developed. Therefore, methods for reinforcement and repair of such structures continue to be sought.

SUMMARY

It has been recognized that development of improved methods for strengthening or reinforcing elongate members, such as columns, pipes, and walls, particularly with respect to a footing, foundation, or beam would be a significant advancement in the industry. Accordingly, an elongate member reinforcement system is provided. Such a system can comprise an elongate member, a structure associated with an end of the elongate member, a support member coupled to the structure and laterally offset from the elongate member extending about an end portion of the elongate member, a support layer surrounding the end portion of the elongate member such that at least a portion of the support member is between the support layer and the elongate member, and a structural filler disposed between the support layer and the elongate member. A load tending to cause relative movement of the end portion of the elongate member and the structure can be transferred through the structural filler and the support member to provide support for the elongate member.

In one aspect, a method for reinforcing an elongate member is disclosed. The method can comprise coupling a support member to a structure that is associated with an end of an elongate member such that the support member is laterally offset from the elongate member and extends about an end portion of the elongate member. The method can further comprise disposing a support layer about the end portion of the elongate member such that at least a portion of the support member is between the support layer and the elongate member. In addition, the method can comprise disposing a structural filler between the support layer and the elongate member, wherein a load tending to cause relative movement of the end portion of the elongate member and the structure is transferred through the structural filler and the support member to provide support for the elongate member.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1:
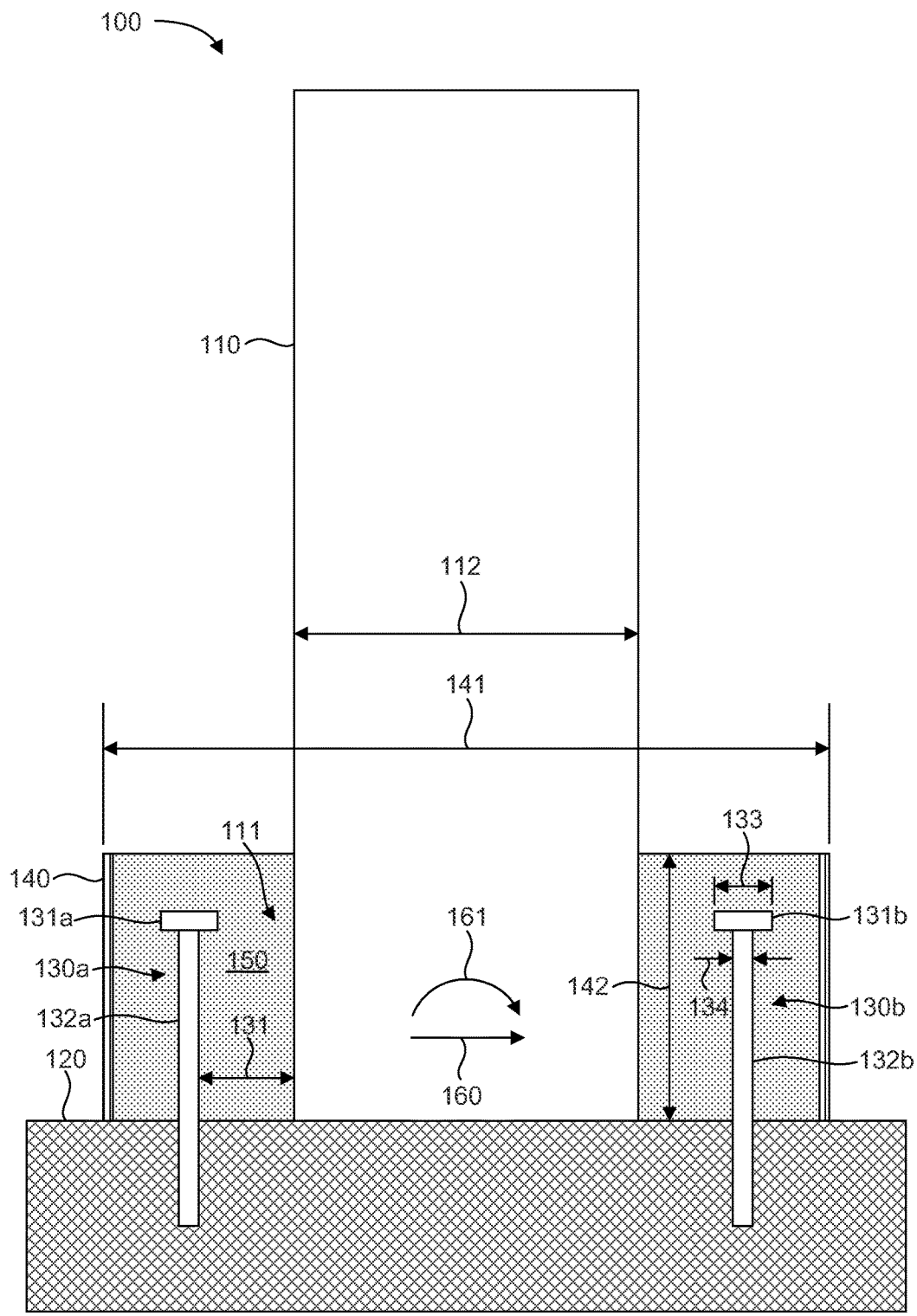
FIG. 1 illustrates a side view of an elongate member reinforcement system in accordance with an example of the present disclosure.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

As used herein, "cement" as any material which can be used to bind. For example, concrete can include crushed stone, sand, and a cement. Portland cement is a fired mixture of limestone and clay which, when hydrated, forms interlocking crystals which bind to the sand, stone, and one another. Cements can generally be classified as shrink, non-shrink, or expansive cements. The most commonly used cement for general construction is shrink cement.

As used herein, "post-tension" refers to tension created or induced in a material subsequent to formation. For example, post-tensioning of a support layer made of FRP occurs after curing of the FRP support layer to create a post-tensioned support layer having circumferential, or hoop stress.

The singular forms "a," "an," and "the" include plural referents unless the context clearly dictates otherwise. Thus, for example, reference to "a particle" includes reference to one or more of such materials and reference to "subjecting" refers to one or more such steps.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

With reference to FIG. 1, a side view of an elongate member reinforcement system 100 is illustrated in accordance with an example of the present disclosure. The elongate member reinforcement system 100 can include an elongate member 110, a structure 120 associated with an end of the elongate member 110, one or more support members 130a, 130b coupled to the structure 120, a support layer 140 surrounding an end portion 111 of the elongate member 110, and a structural filler 150 disposed between the support layer 140 and the elongate member 110. The support member 130a, 130b can be laterally offset 131 from the elongate member 110 and extend about the end portion 111 of the elongate member 110. The support layer 140 can surround the end portion 111 of the elongate member 110 such that at least a portion of the support member 130a, 130b is between the support layer 140 and the elongate member 110. In one aspect, the support member 130a, 130b, the support layer 140, and/or the structural filler 150 can "lap" or project beyond the end portion 111 of the elongate member 110 to provide structural support for the elongate member 110. Thus, a load, such as a force 160 and/or a moment 161, tending to cause relative movement of the end portion 111 of the elongate member 110 and the structure 120 can be transferred through the structural filler 150 and the support member 130a, 130b to provide support for the elongate member 110. The load can be an externally applied load and/or a load internal to the elongate member 110 and/or the structure 120. In one aspect, at least a portion of the load can be produced by a seismic event, an explosion (i.e., from a terrorist attack), an impact (i.e., from a vehicle), and/or wind (i.e., from a hurricane or tornado). Thus, the reinforcement system 100 can protect the elongate member 110 and the structure 120 from an extreme loading event.

The reinforcement system concepts and elements disclosed herein can be applied to new construction, retrofitted to existing construction, or utilized for repair or rehabilitation of a damaged structure, such as due to corrosion or excessive loading. In one aspect, the elongate member 110 can include a column, pipe, pile, tube, bollard, etc. and the structure 120 associated with the end of the elongate member 110 can include a footing, a floor, a cap beam, a truss, etc. The elongate member 110 can have any cross-sectional shape (i.e., round or square cross-section) or other configuration (i.e., a flange) and can be designed for any purpose, such as a structural component of a building and/or as a fluid conveying element. The elongate member 110 can be of any suitable size or proportion. Typically, the elongate member 110 will have a diameter 112 of between about 10 inches and about 60 inches, although diameters outside of this range are also contemplated. In addition, the elongate member 110 and/or the structure 120 can be constructed of any suitable material, such as concrete, steel, wood, plastic, masonry, etc. In another aspect, the structure 120 can be at least partially submerged in water or can be at least partially underground.

In some cases, the elongate member 110 can be coupled to the structure 120 independent of the support member 130a, 130b, the support layer 140, and the structural filler 150, such as via rebar (not shown) internal to the elongate member extending into the structure 120 and/or by being integrally formed with one another. In these cases, the support member 130a, 130b, the support layer 140, and the structural filler 150 can protect the connection and increase the stiffness of the elongate member 110, thereby improving the resistance of the connection to loads. In other cases, the elongate member 110 can simply be in contact with the structure 120, such as by resting on the structure 120. In such cases, the support member 130a, 130b, the support layer 140, and the structural filler 150 can form or establish a connection between the elongate member 110 and the structure 120 that has sufficient stiffness and strength to withstand a given loading event. For example, the support member 130a, 130b, the support layer 140, and the structural filler 150 can transfer tension (i.e., resulting from a moment load) between the elongate member 110 and the structure 120. Thus, a bending load acting on the elongate member 110 can be transferred through the structural filler 150 and the support member 130a, 130b to the structure 120.

As mentioned above, the support member 130a, 130b can be coupled to the structure 120 and, along with the support layer 140 and the structural filler 150, can provide support for the elongate member 110. In one aspect, the support member 130a, 130b can be configured, primarily, to withstand a tensile load. Accordingly, the support member 130a, 130b can be of any suitable configuration for this purpose. For example, the support member 130a, 130b can comprise a dowel, a bar, a cable, a wire, and/or any other suitable feature or structure for withstanding a tensile load. In one aspect, the support member 130a, 130b can be constructed of carbon, fiberglass, FRP, steel, or any other suitable structural material for a support member as disclosed herein. In another aspect, the support member 130a, 130b can be configured to mechanically bond with the structural filler 150. For example, the support member 130a, 130b can comprise a head portion 131a, 131b and a stem portion 132a, 132b, respectively. A lateral size dimension 133 of the head portion 131a, 131b can be greater than a lateral size dimension 134 of the stem portion 132a, 132b to facilitate mechanically bonding the support member 130a, 130b with the structural filler 150. In one aspect, the support member 130a, 130b can include surface features or geometry configured to enhance friction with the structural filler 150, such as that typically found on rebar, to facilitate mechanically bonding the support member 130a, 130b with the structural filler 150.

The support layer 140 can be disposed about the structural filler 150 and the support member 130a, 130b to provide confinement compression for the structural filler 150 to maintain the structural integrity of the structural filler 150 about the elongate member 110 and the support member 130a, 130b. Accordingly, the support layer 140 can be configured to be in tension and, in particular, to withstand a hoop stress. In one aspect, the support layer 140 can comprise FRP material, which can comprise a fiber and polymeric matrix. The fiber can comprise a glass fiber, a carbon fiber, and/or an aramid fiber, although other fiber materials can also be used. Any suitable FRP material can be used that includes a fiber material and a polymeric matrix. Non-limiting examples of commercial products can include SikaWrap®, Aquawrap®, and the like. FRP material can enable the support layer 140 to be semi-rigid and elastically deformable. In one aspect, the support layer 140 can be configured to have a hoop stress along the fiber reinforced polymer material. The support layer 140 can be constructed of sheet material and can include one or more overlapping sheets and/or non-overlapping sheets. The support layer 140 can also comprise materials such as, but not limited to, a wire mesh, steel, aluminum, wire mesh cardboard, or plastic in certain cases. When an interior support layer is used, any suitable preformed formwork can be acceptable. Steel or close gridded wire mesh can be used in most applications where corrosion is not a concern. Alternatively, FRP is particularly useful where corrosion is of concern.

The support layer 140 can be of any suitable cross-sectional shape, which may be selected according to space constraints, mechanical properties, structural properties, and/or aesthetic properties. In one aspect, the support layer 140 can have a cross sectional shape similar to the cross sectional shape of the elongate member 110. Alternatively, a support layer 140 can have a cross sectional shape that is different from the cross sectional shape of elongate member 110. For example, the support layer 140 can have a circular cross sectional shape and the elongate member 110 can have a square cross-sectional shape. In another example, the elongate member 110 can have a rectangular cross sectional shape and the support layer 140 can have an elliptical cross sectional shape.

The support layer 140 can also define certain dimensions of the reinforcement system 100. For example, the support layer 140 can establish a diameter 141 and the height 142 of the reinforcement system 100 about the elongate member 110. Typically, the support layer 140 will have a diameter 141 of between about 10 inches and about 60 inches and a height 142 of between about 12 inches and about 48 inches, although dimensions outside of these ranges are also contemplated.

The structural filler 150 can include an expansive cement, conventional shrink cement, and/or a non-shrink cement. A typical unstressed FRP composite jacket does not participate in the confinement of concrete until the concrete starts expanding, which usually involves at least partial failure of the concrete and/or softening of the concrete. In one aspect of the present disclosure, however, an expansive concrete can be advantageously used between the support layer 140 and the elongate member 110 in order to post-tension the support layer 140 circumferentially and improve confinement of the elongate member 110 structural material. Thus, in a new construction, for example, expansive concrete can post-tension the support layer 140 in the hoop direction prior to application of vertical or axial loading to the elongate member 110. In another aspect, expansive concrete can fix the elongate member 110 in place with shear friction. A shrinkage compensated or non-shrinkage cement or concrete can also be used as the structural filler 150. A structural grout can be used as the grout to make non-shrink concrete. Alternatively, conventional shrink cement can be used, especially when relatively smaller diameters are used and where spiral reinforcing is used.

Figure 2A:
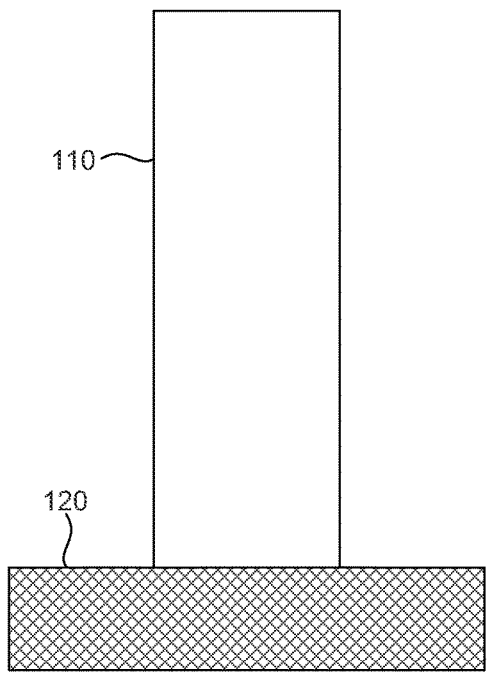
FIGS. 2A-2D illustrate steps for constructing the elongate member reinforcement system of FIG. 1, in accordance with an example of the present disclosure.
Figure 2B:
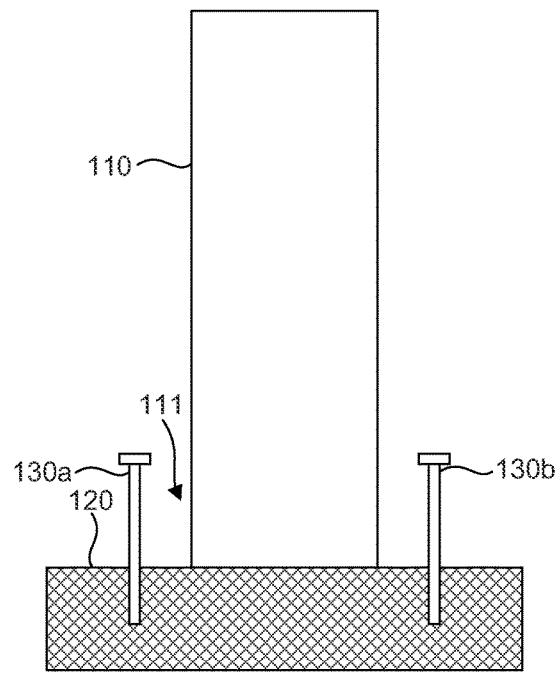
Figure 2C:
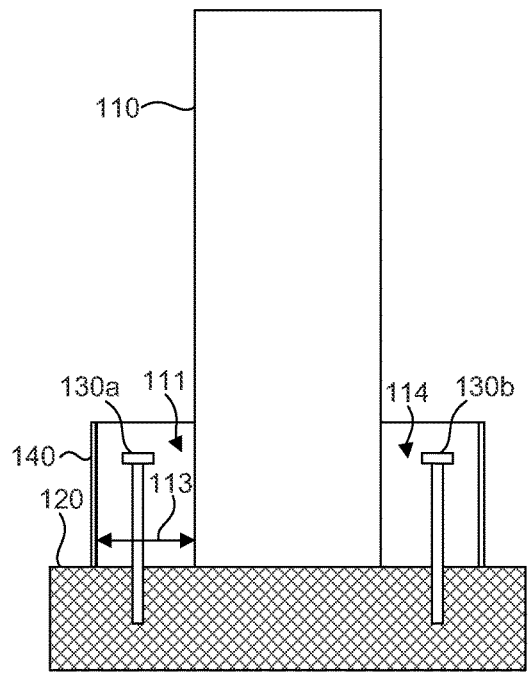

FIGS. 2A-2D illustrate steps for constructing the elongate member reinforcement system 100 of FIG. 1, in accordance with an example of the present disclosure. FIG. 2A shows an end of the elongate member 110 associated with the structure 120. The elongate member 110 can simply be in contact with the structure 120 or coupled to the structure 120, such as via rebar (not shown) internal to the elongate member extending into the structure 120 and/or by being integrally formed with one another. In this condition, the elongate member 110 may not be able to withstand various loading scenarios and may benefit from reinforcement. Thus, as shown in FIG. 2B, the support member 130a, 130b can be coupled to the structure 120 such that the support member 130a, 130b is laterally offset from the elongate member 110 and extends about the end portion 111 of the elongate member 110. As shown in FIG. 2C, the support layer 140 can be disposed about the end portion 111 of the elongate member 110 such that at least a portion of the support member 130a, 130b is between the support layer 140 and the elongate member 110. In one aspect, the support layer 140 can be premade in an oval, cylindrical, or other shape, and used as a stay-in-place form. In another aspect, the support layer 140 can be spliced around the elongate member 110 and/or constructed in-situ around the elongate member 110.

Figure 2D:
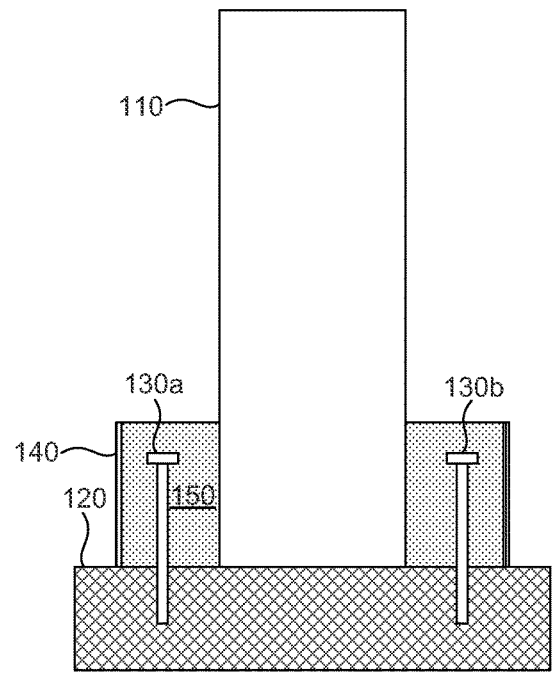

A lateral gap 113 between the support layer 140 and the elongate member can depend on the dimensions of the elongate member 110 as well as the size of the support member 130a, 130b, but is typically at least 4 inches. With the support layer 140 around the elongate member 110 and the support member 130a, 130b, there is a space 114 between the support layer 140 and the elongate member 110. In one aspect, the support layer 140 can be located adjacent to, or "flush" with, the support structure 120 to prevent leakage of the structural filler 150 between the support layer 140 and the support structure 120 when deposited in the space 114 between the support layer 140 and the elongate member 110, as shown in FIG. 2D. An expansive concrete can be disposed between the support layer 140 and the elongate member 110 to post-tension the support layer 140 circumferentially and improve confinement of the elongate member 110 structural material and/or fix the elongate member 110 in place with shear friction. When using a shrinkage compensated or non-shrinkage cement or concrete as the structural filler 150, the non-shrinkage concrete can be placed into a premade support layer about the elongate member 110 and the support members 130a, 130b. Once the aging of the concrete is stable, the support layer 140 can be wrapped around the structural filler 150 using a wet lay-up process.

In one aspect, the support layer 140 can comprise at least two pieces that can be placed around the elongate member 110 to form the support layer 140. This can be achieved by separating the support layer 140 into two pieces and placing the two pieces around the elongate member 110 to form the support layer 140. To reinforce an elongate member 110 it may be necessary to separate the support layer 140 longitudinally into a first piece and a second piece. The first piece and second piece can then be placed around the elongate member 110 to reform the support layer 140, leaving the open space 114 between the elongate member 110 and the support layer 140.

In a particular aspect, once the first piece and second piece have been placed around the elongate member 110 they can be coupled to one another with an adhesive or spliced with a vertical FRP composite strip along each seam between the first piece and second piece so as to form a unitary support layer 140. In one aspect, after the first and second piece of the support layer 140 have been spliced with a vertical FRP composite strip, additional FRP material may be wrapped around the support layer 140. Typically the wrapping can be done with a single continuous sheet. However, multiple sheets can be wrapped in a wet lay-up process followed by curing of the polymer resin. The number of layers will typically range from 1 to about 14 additional layers. Additional sheets can provide auxiliary reinforcement to the elongated element, and can be applied to exterior surfaces of the element, inside the support layer. In additional to dowling to the footing, such additional layers can move the yielding zone away from the interface.

In one aspect, FRP materials can be placed along a longitudinal axis of the elongate member 110 in direct contact with the elongate member 110, either during or after formation of the FRP shell, for increased flexural resistance of the elongate member 110, if required.

Many applications will call for a FRP support layer 140 that is pre-manufactured. However, many applications will require manufacture of the support layer 140. In these applications, a mold can be prepared in order to form the FRP support layer 140. A mold can be prepared to correspond with a desired final shape of the elongate member 110. A mold is not necessarily the same shape as the elongate member 110. Frequently, a rectangular or square elongate member 110 can be modified to produce a circular or elliptical elongate member 110 of slightly larger width.

Once the mold has been prepared, the mold can be wrapped with at least one layer of FRP material to form the support layer 140. The mold can then be removed leaving the support layer 140 as an independent structure. Typically, the wrapping can be done with a single continuous sheet. However, multiple sheets can be wrapped in a wet lay-up process followed by curing of the polymer resin. The sheets may be cut to a desired size or as lengths of fiber strands, which can be wrapped and/or laid as desired to form a particular shape. Most often, the number of layers can range from 1 to about 14 additional layers.

Wrapping of the mold may include a wet layup of resin coated fibers followed by a curing of the resin. Once the resin has cured, the support layer 140 can be divided longitudinally into at least a first piece and a second piece so that it can be used in applications that require retrofitting elongate member 110.

In one aspect, support layer 140 materials can be "prepreg" and/or "pre-cured." In another aspect, the resin or epoxy used can be configured to be activated to cure at an ambient temperature or to cure at an elevated temperature.

Figure 3:
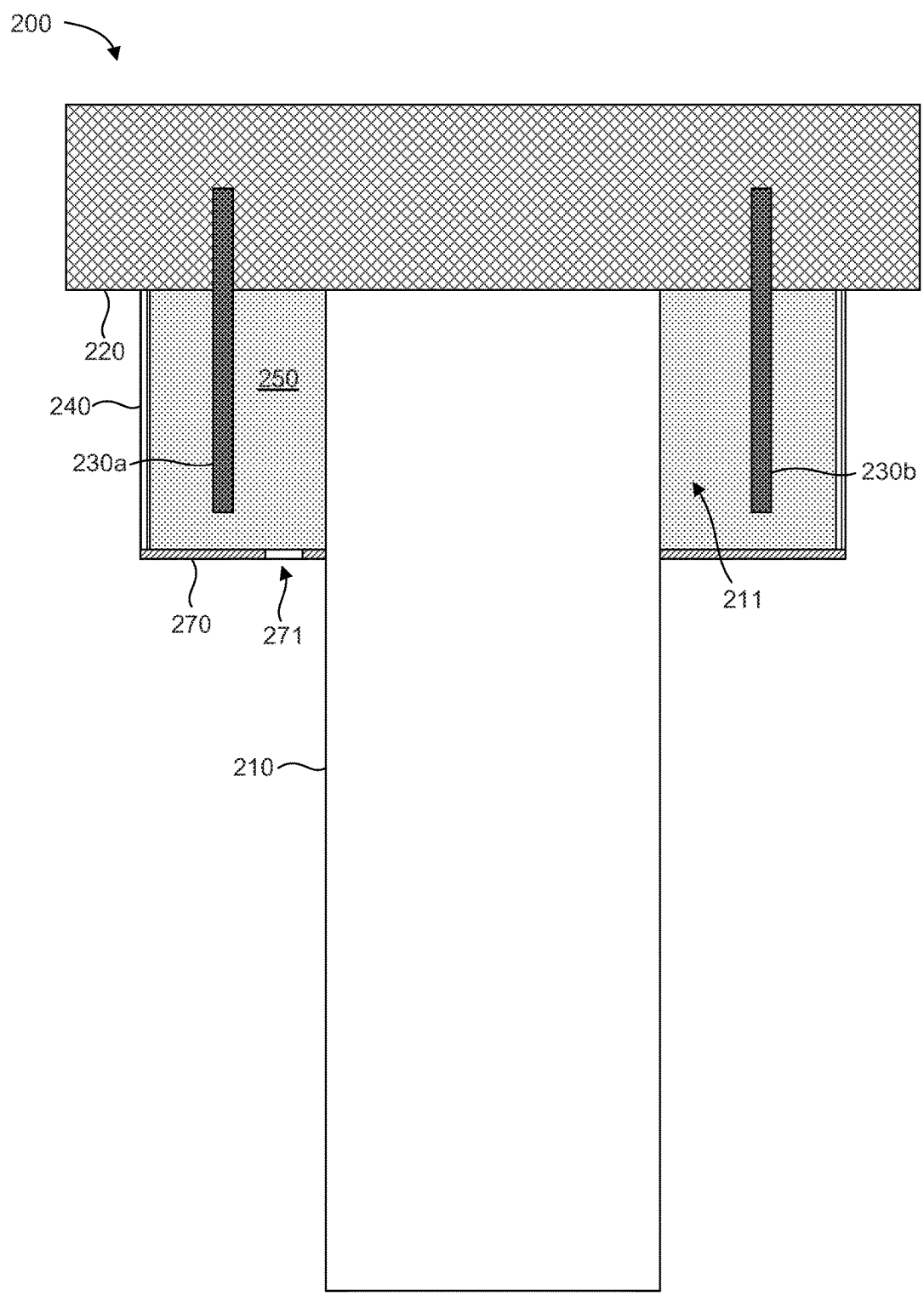
FIG. 3 illustrates a side view of an elongate member reinforcement system in accordance with another example of the present disclosure.

FIG. 3 illustrates a side view of an elongate member reinforcement system 200 in accordance with another example of the present disclosure. The elongate member reinforcement system 200 is similar in many respects to the elongate member reinforcement system 100 of FIG. 1. For example, the elongate member reinforcement system 200 can include an elongate member 210, a structure 220 associated with an end of the elongate member 210, one or more support members 230a, 230b coupled to the structure 220, a support layer 240 surrounding an end portion 211 of the elongate member 210, and a structural filler 250 disposed between the support layer 240 and the elongate member 210. In this case, the end of the elongate member 210 is an upper end. Thus, the structure 220 associated with the end of the elongate member 210 can comprise a cap beam, truss, etc. In one aspect, both the upper and lower ends of the elongate member 210 can be reinforced in accordance with the principles disclosed herein.

The elongate member reinforcement system 200 can include a retaining member 270 to retain and support the structural filler 250 as it cures and solidifies. The retaining member 270 can include an access opening 271 to facilitate disposing the structural filler between the support layer 240 and the elongate member 210, after which the access opening can be closed or plugged to prevent leakage of the structural filler 250 prior to solidification. Although a wide variety of materials may be used, the retaining member can be made of FRP, steel, wood or plastic, and can bond to the adjacent support layer to contain the filler material.

The elongate member reinforcement system 200 includes support members 230a, 230b without heads. In one aspect, the support members 230a, 230b can have a substantially constant diameter along a longitudinal axis. For example, the support members 230a, 230b can be rebar, which can have surface textures or recesses to capture a portion of the structural filler 250 to mechanically bond the support member 230a, 230b with the structural filler 250.

Figure 4:
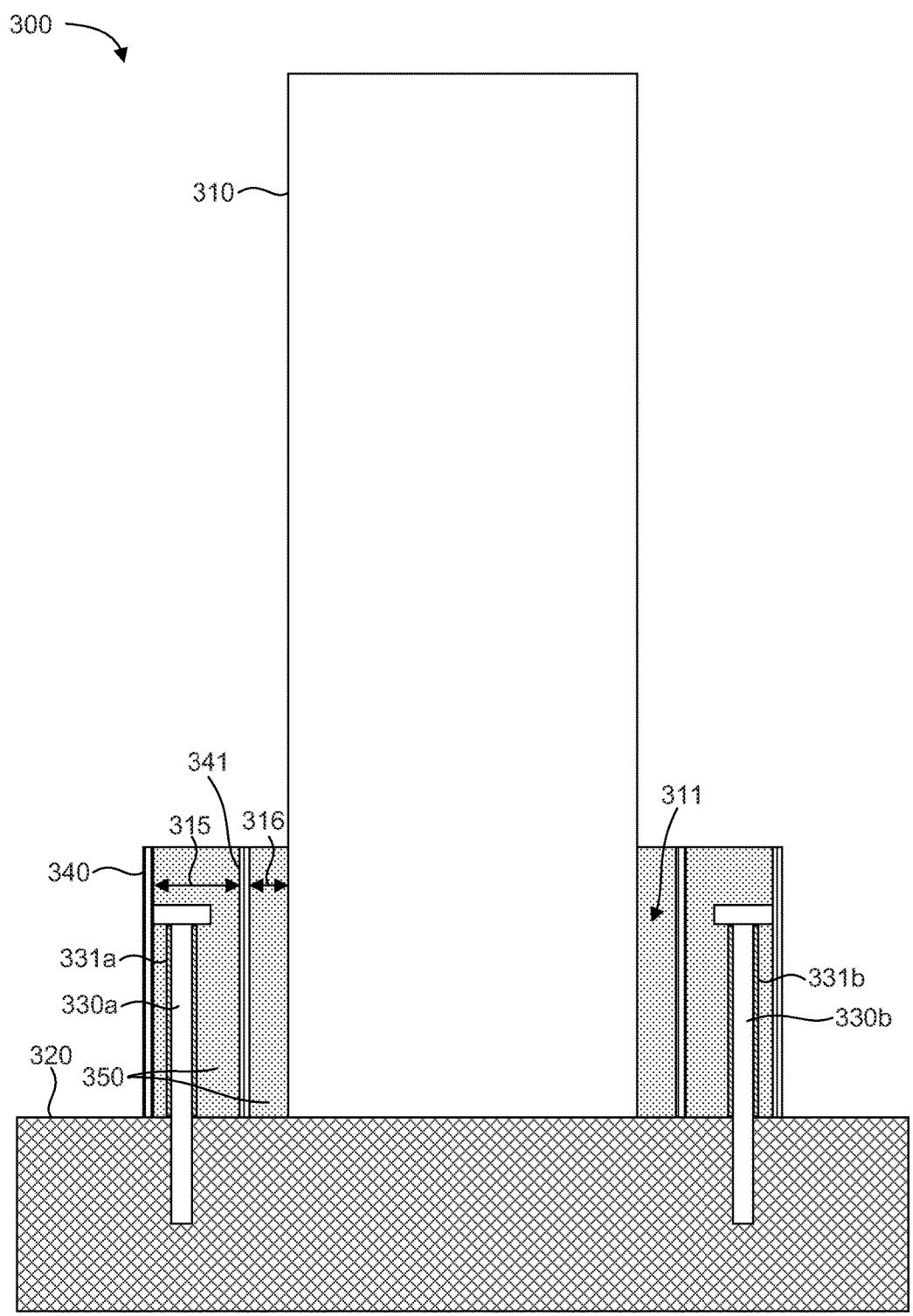
FIG. 4 illustrates a side view of an elongate member reinforcement system in accordance with yet another example of the present disclosure.

FIG. 4 illustrates a side view of an elongate member reinforcement system 300 in accordance with yet another example of the present disclosure. The elongate member reinforcement system 300 is similar in many respects to the elongate member reinforcement systems discussed above. For example, the elongate member reinforcement system 300 can include an elongate member 310, a structure 320 associated with an end of the elongate member 310, one or more support members 330a, 330b coupled to the structure 320, a support layer 340 surrounding an end portion 311 of the elongate member 310, and a structural filler 350 disposed between the support layer 340 and the elongate member 310. In this case, the elongate member reinforcement system 300 includes a support layer 341 between the support layer 340 and the elongate member 310. In one aspect, a first portion of the structural filler 350 can be disposed between the support layer 341 and the elongate member 310 and a second portion of the structural filler 350 can be disposed between the support layer 340 and the support layer 341. In other words, multiple support layers 340, 341 can be formed around the end portion 311 of the elongate member 310 with a gap 315 between them. The gap 315 and a gap 316 between the support layer 341 and the elongate member 310 can be filled with structural filler 350. In one aspect, the support layer 340 can be proximate the support members 330a, 330b. In another optional aspect, the support members 330a, 330b can include a spiral reinforcement 331a, 331b, respectively, wound around the support members. Such spiral reinforcement can typically be steel or FRP, although other materials may also be suitable. For example, support layer 340 can be FRP, steel wood, etc. and while support layer 341 can be steel mesh, steel spiral, FRP mesh, or FRP spiral.

Figure 5:
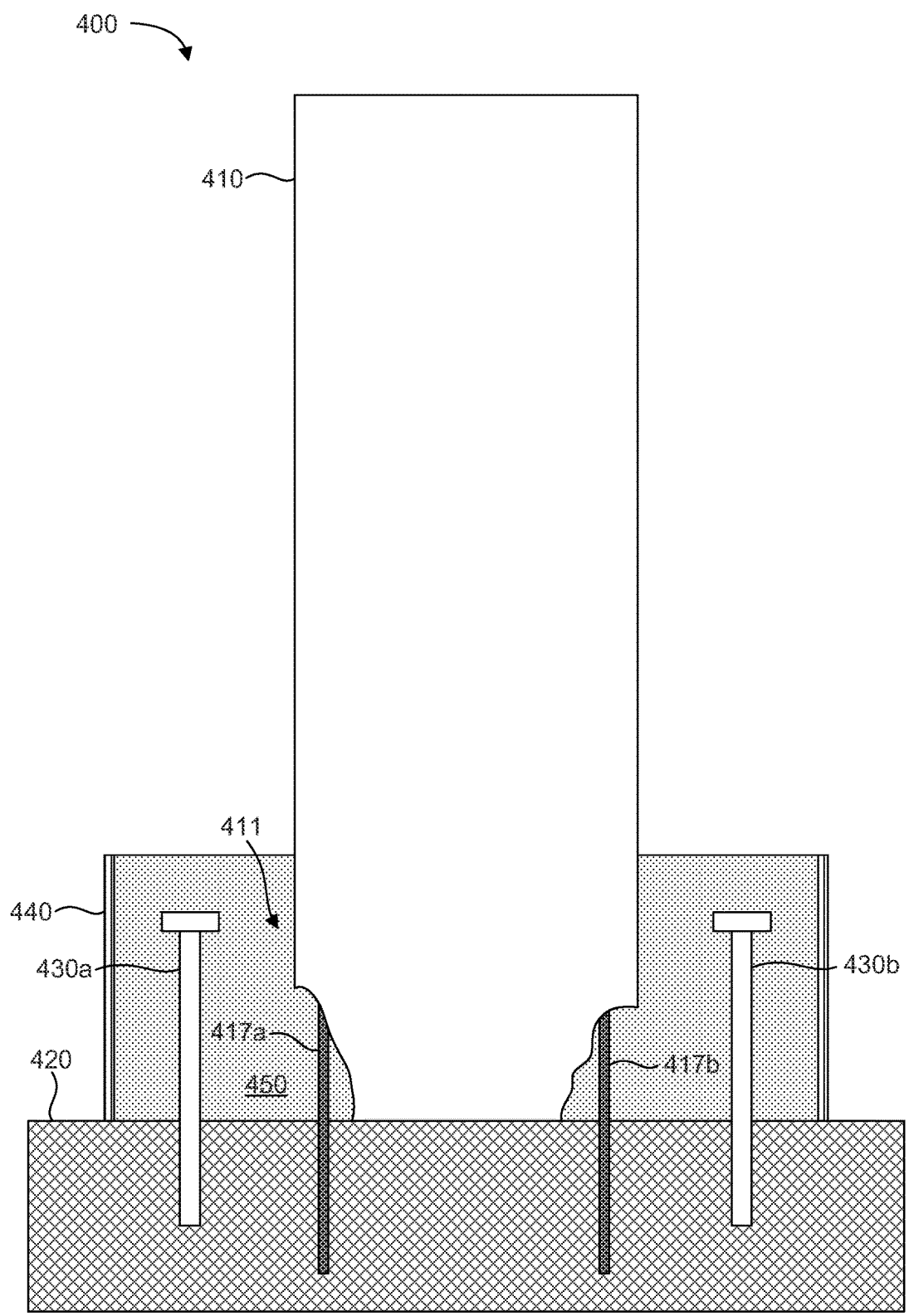
FIG. 5 illustrates a side view of an elongate member reinforcement system in accordance with still another example of the present disclosure.

FIG. 5 illustrates a side view of an elongate member reinforcement system 400 in accordance with still another example of the present disclosure. The elongate member reinforcement system 400 is similar in many respects to the elongate member reinforcement systems discussed above. For example, the elongate member reinforcement system 400 can include an elongate member 410, a structure 420 associated with an end of the elongate member 410, one or more support members 430a, 430b coupled to the structure 420, a support layer 440 surrounding an end portion 411 of the elongate member 410, and a structural filler 450 disposed between the support layer 440 and the elongate member 410. In this case, the elongate member 410 includes one or more reinforcement members 417a, 417b, such as steel reinforcement or rebar. In one aspect, the reinforcement member 417a, 417b can be exposed to the structural filler 450. Thus exposed, the reinforcement member 417a, 417b can mechanically bond with the structural filler 450, thereby improving the coupling of the structural filler 450 to the elongate member 410. Such exposure of the reinforcement member 417a, 417b can be due to erosion of the elongate member 410 and/or due to intentional removal of material from the elongate member 410 to prepare the elongate member 410 prior to reinforcement. The elongate member reinforcement system 400 can therefore be effective even when the reinforcement member 417a, 417b is debonded or broken.

Figure 6:
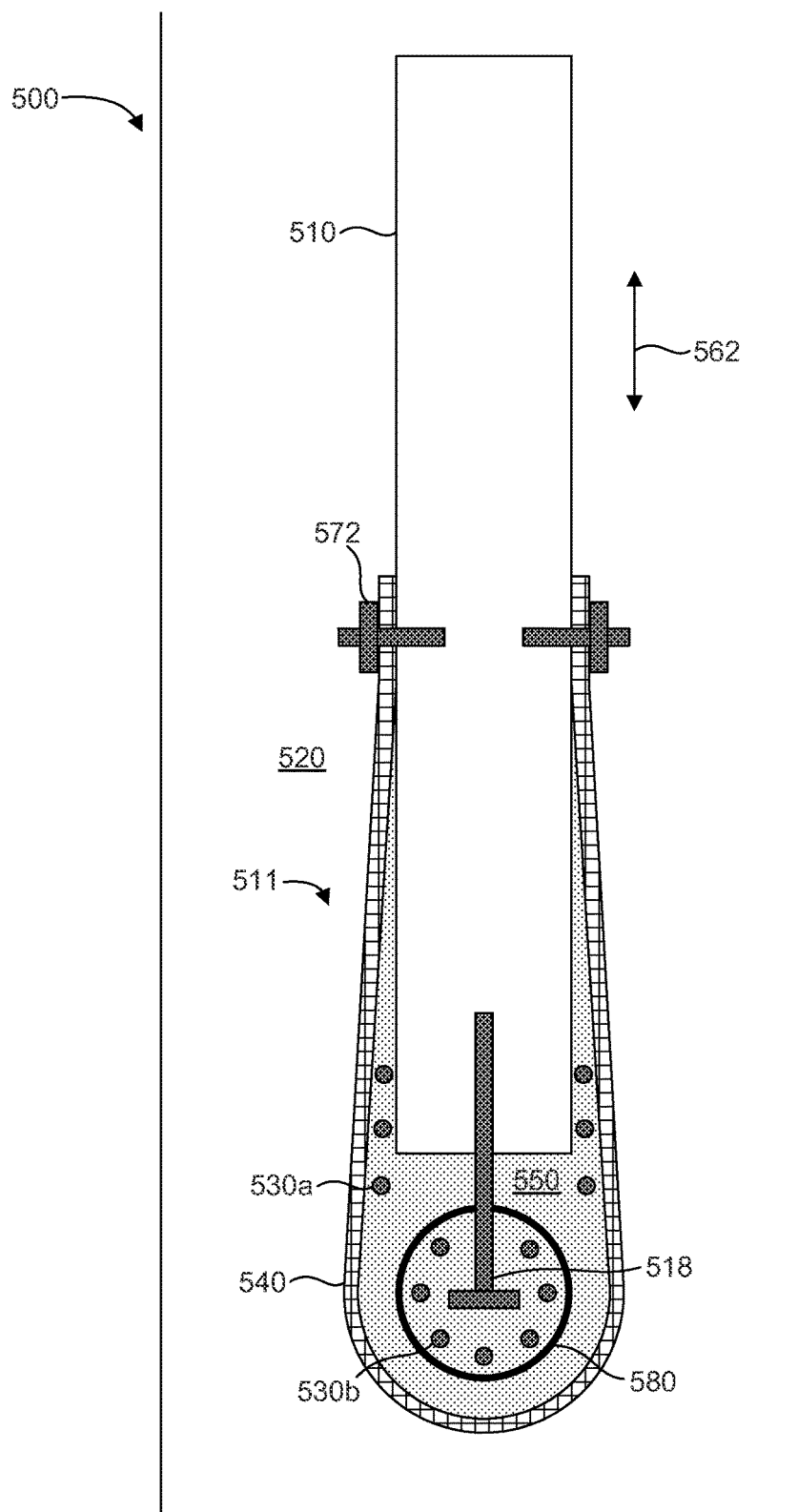
FIG. 6 illustrates a plan view of an elongate member reinforcement system in accordance with a further example of the present disclosure.

FIG. 6 illustrates a plan view of an elongate member reinforcement system 500 in accordance with a further example of the present disclosure. The elongate member reinforcement system 500 includes several similarities with the elongate member reinforcement systems discussed above. For example, the elongate member reinforcement system 500 can include an elongate member 510, a structure 520 and/or vertical axial loads associated with an end of the elongate member 510, one or more support members 530a, 530b coupled to the structure 520, a support layer 540 surrounding an end portion 511 of the elongate member 510, and a structural filler 550 disposed between the support layer 540 and the elongate member 510. In this case, the elongate member comprises a wall, such as a shear wall. The reinforcement system 500 can be configured to provide increased resistance to loads in direction 562. In one aspect, the end portion 511 of the wall 510 can comprise a lower end portion and/or a side end portion of the wall 510. In addition, the support layer 540 is attached to the wall 510. The support layer 540 can be attached to the wall 510 by any suitable means, such as a bolt 572, drilled anchor, or other fastener. A reinforcement member 518 can be coupled to the wall 510 and configured to extend from the wall 510. In one aspect, the reinforcement member 518 can include a head feature to improve the coupling with the structural filler 550. The support member 530b can be surrounded by an internal support structure 580, such as a spiral or hoop formed of steel or FRP. Any suitable number of support members 530a, 530b can be utilized in any suitable arrangement or configuration. Furthermore, the end of member 510 which contacts filler 550 can be shaped or grooved to increase bonding and interaction with the filler 550.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:
1. An elongate member reinforcement system, comprising:
   an elongate member;
   a structure associated with an end of the elongate member, the elongate member extending from the structure in a longitudinal direction;
   a support member coupled to the structure such that the support member extends into the structure, the support member being laterally offset from the elongate member and extending from the structure about an end portion of the elongate member to longitudinally overlap the end portion of the elongate member in the longitudinal direction;
   a support layer surrounding and longitudinally overlapping the end portion of the elongate member in the longitudinal direction and defining a space therebetween, wherein at least a portion of the support member is between the support layer and the elongate member; and
   a structural filler disposed in the space between the support layer and the elongate member, wherein the structural filler is in contact with the end portion of the elongate member, the support layer, and the support member,
   wherein the support member is configured to mechanically bond with the structural filler and the support member comprises a head portion and a stem portion, wherein a lateral size dimension of the head portion is greater than a lateral size dimension of the stem portion to mechanically bond the support member with the structural filler, and wherein a load tending to cause relative movement of the end portion of the elongate member and the structure is transferred through the structural filler and the support member to provide support for the end portion of the elongate member.

2. The system of claim 1, wherein the support layer comprises at least one of a fiber reinforced polymer material, steel, fine gridded steel mesh, plastic, and cardboard.

3. The system of claim 2, wherein the support layer is post-tensioned using expansive grout, and has a hoop stress along the fiber reinforced polymer material.

4. The system of claim 2, wherein the fiber reinforced polymer material comprises a fiber and a polymeric matrix.

5. The system of claim 4, wherein the fiber comprises at least one of glass fiber, carbon fiber, steel fiber, and aramid fiber.

6. The system of claim 1, wherein the support layer comprises a wire mesh.

7. The system of claim 1, further comprising a second support layer between the first support layer and the elongate member, wherein a first portion of the structural filler is disposed between the second support layer and the elongate member and a second portion of the structural filler is disposed between the first support layer and the second support layer.

8. The system of claim 1, wherein the support layer is adjacent to the support member.

9. The system of claim 1, wherein the support member comprises at least one of a dowel, a bar, and a cable.

10. The system of claim 1, wherein the support member is constructed of at least one of steel, carbon, and fiberglass.

11. The system of claim 1, wherein a surface of the support member comprises a recess to capture a portion of the structural filler to mechanically bond the support member with the structural filler.

12. The system of claim 1, wherein the support member comprises a plurality of support members.

13. The system of claim 1, wherein the structural filler comprises at least one of an expansive cement, shrink cement, and a non-shrink cement.

14. The system of claim 1, wherein the load comprises at least one of a force and a moment.

15. The system of claim 1, wherein the elongate member comprises at least one of a column, a beam, a pipe, a pole, a pile, and a wall.

16. The system of claim 1, wherein the elongate member comprises a reinforcement member, and wherein the reinforcement member is exposed to the structural filler to mechanically bond the reinforcement member with the structural filler.

17. The system of claim 16, wherein the reinforcement member comprises rebar, headed studs, or U-shaped steel dowels.

18. The system of claim 1, wherein the end of the elongate member is a lower end or an upper end.

19. The system of claim 1, wherein the structure comprises a footing, a foundation, or a cap beam.

20. A method for reinforcing an elongate member, comprising:
coupling a support member to a structure that is associated with an end of an elongate member, such that the support member extends into the structure, wherein the elongate member extends from the structure in a longitudinal direction, and wherein the support member is laterally offset from the elongate member and extends from the structure about an end portion of the elongate member to longitudinally overlap the end portion of the elongate member in the longitudinal direction;
surrounding and longitudinally overlapping the end portion of the elongate member in the longitudinal direction with a support layer such that a space is defined therebetween, wherein at least a portion of the support member is between the support layer and the elongate member; and
disposing a structural filler in the space between the support layer and the elongate member, wherein the structural filler is in contact with the end portion of the elongate member, the support layer, and the support member, wherein a load tending to cause relative movement of the end portion of the elongate member and the structure is transferred through the structural filler and the support member to provide support for the end portion of the elongate member, and wherein the support member is configured to mechanically bond with the structural filler and the support member comprises a head portion and a stem portion, wherein a lateral size dimension of the head portion is greater than a lateral size dimension of the stem portion to mechanically bond the support member with the structural filler.

21. The method of claim 20, further comprising disposing a second support layer between the first support layer and the elongate member, wherein disposing a structural filler between the support layer and the elongate member comprises disposing a first portion of the structural filler between the second support layer and the elongate member and disposing a second portion of the structural filler between the first support layer and the second support layer.

22. The method of claim 20, wherein the elongate member comprises a reinforcement member, and wherein the reinforcement member is exposed to the structural filler to mechanically bond the reinforcement member with the structural filler.

23. The method of claim 22, further comprising removing material from the elongate member to expose the reinforcement member.

24. The method of claim 20, wherein the support layer is adjacent to the support member.

25. The method of claim 20, wherein the support layer comprises at least one of a fiber reinforced polymer material and wire mesh.

26. The method of claim 20, wherein the support layer is post-tensioned with the structural filler, and has a hoop stress along the fiber reinforced polymer material.

27. The method of claim 20, wherein the structural filler comprises at least one of an expansive cement, shrink cement, and a non-shrink cement.

* * * * *